(12) United States Patent
Mizuno (10) Patent No.: US 7,154,083 B2
(45) Date of Patent: Dec. 26, 2006

(54) CONFOCAL PROBE

(75) Inventor: Rogerio Jun Mizuno, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 263 days.

(21) Appl. No.: 10/784,308

(22) Filed: Feb. 24, 2004

(65) Prior Publication Data

US 2004/0173738 A1    Sep. 9, 2004

(30) Foreign Application Priority Data

| Feb. 24, 2003 | (JP) | ............................ 2003-046625 |
| Feb. 24, 2003 | (JP) | ............................ 2003-046626 |
| Feb. 24, 2003 | (JP) | ............................ 2003-046627 |

(51) Int. Cl.
  H01J 3/14    (2006.01)
  H01J 5/16    (2006.01)
  G01J 1/04    (2006.01)

(52) U.S. Cl. ...................... 250/234; 356/326; 600/168

(58) Field of Classification Search ................ 250/216, 250/234–236, 227.11, 227.12, 227.2, 227.26; 356/326, 328, 332; 600/108, 109, 160, 182, 600/168, 473, 476; 359/223, 224, 290, 291, 359/295, 296, 871
See application file for complete search history.

(56) References Cited

U.S. PATENT DOCUMENTS

| 5,022,743 A | 6/1991 | Kino et al. |
| 5,035,476 A | 7/1991 | Ellis et al. |
| 5,120,953 A | 6/1992 | Harris |
| 5,323,009 A | 6/1994 | Harris |
| 5,606,447 A | 2/1997 | Asada et al. |
| 5,742,419 A | 4/1998 | Dickensheets et al. |
| 5,767,666 A | 6/1998 | Asada et al. |
| 6,327,493 B1 | 12/2001 | Ozawa et al. |
| 6,433,910 B1 | 8/2002 | Suga |
| 6,483,626 B1 | 11/2002 | Suga |
| 6,545,260 B1 | 4/2003 | Katashiro et al. |
| 2004/0122289 A1* | 6/2004 | Mizuno ...................... 600/168 |
| 2004/0165184 A1* | 8/2004 | Mizuno ...................... 356/326 |

FOREIGN PATENT DOCUMENTS

| EP | 1142529 | 10/2001 |
| JP | 3032720 | 2/2000 |
| JP | 3052150 | 4/2000 |

OTHER PUBLICATIONS

V. A. Aksyuk et al., "238×238 Surface Micromachined Optical Crossconnect with 2dB Maximum Loss," Optical Fiber Communications Conference OFC 2002.

* cited by examiner

Primary Examiner—Stephone B. Allen
(74) Attorney, Agent, or Firm—Greenblum & Bernstein, P.L.C.

(57) ABSTRACT

A confocal probe emits a scanning beam to a target and receives light returned therefrom to obtain an image thereof. The confocal probe has a chamber accommodating an optical system. The optical system includes an optical fiber through which a light beam is introduced to the optical system, a converging lens that converges the light beam introduced by the optical fiber, an optical element having a light incident surface, a first surface and a light emerging surface which statically define an optical path of the light beam, and a deflecting device mounted on the first surface of the optical element. The light beam enters the optical element through the light incident surface, enters the deflecting device through the first surface, and is dynamically deflected by the deflecting device. The deflected beam is output through the light emerging surface, as the scanning beam, toward the target.

23 Claims, 8 Drawing Sheets

CONFOCAL PROBE

BACKGROUND OF THE INVENTION

The present invention relates to a confocal probe for an endoscopic diagnosis to obtain a high-magnification tomogram of in vivo tissues in a human cavity.

Conventionally, when in vivo tissues are investigated at a thorough examination of a body, tissues at a targeted portion is collected using a cutting forceps or the like, and the collected tissues are investigated extracorporeally. Therefore, it takes relatively long time to obtain a diagnosis result, and an appropriate treatment of a patient cannot be taken immediately.

Recently, in order to accelerate the diagnosis procedure, a confocal probe devices have been widely used. The confocal probe enables an operator to perform a non-invasive observation of a tomogram of in vivo tissues. The confocal probe device typically includes a micro-machined fine probe which is employed in confocal microscopes. The confocal probe is typically provided with a scanning mirror provided inside the probe to scan a laser beam on the target (i.e., human tissues) to capture a two-dimensional or three-dimensional image of the target.

Examples of such a confocal probe are disclosed in Japanese Patent Publications No. 3032720 and No. 3052150. The confocal probe device is generally formed such that optical elements are accommodated in a chamber. Specifically, a scanning mirror is mounted on a base plate made of silicon, and the base plate is secured on an inner wall of the chamber using securing members. Such a structure complicates assembling processes and increases the number of assembling processes.

Further, a positional relationship of the scanning mirror with respect to the other optical elements should be kept very precisely. However, to mount the scanning mirror (i.e., the base plate) at an exact position inside the chamber is very difficult. Further, the securing members should be provided at positions farther from the optical axis with respect to the scanning mirror due to their structural limitations. Accordingly, the entire size of the probe device may be upsized, or at least the diameter of the probe device may become relatively large.

SUMMARY OF THE INVENTION

The confocal probe device according to the invention is advantageous in that the size of the probe device can be made relatively small, and further, the assembling processes of the probe device is simplified.

According to an aspect of the invention, there is provided a confocal probe that emits a scanning beam to a target and receives light returned from the target to obtain an image of the target. The confocal probe has a body accommodating an optical system. The optical system is provided with an optical fiber through which a light beam is introduced to the optical system, a converging lens that converges the light beam introduced by the optical fiber, an optical element having a light incident surface, a first surface and a light emerging surface which statically define an optical path of the light beam, and a deflecting device mounted on the first surface of the optical element. The optical fiber, the converging lens and the optical element are secured on an inner wall of the body at predetermined positions. Further, the light beam emerged from the converging lens enters the optical element through the light incident surface, the light beam passed through the light incident surface entering the deflecting device through the first surface, the deflecting device dynamically deflecting the light beam incident thereon, the light beam deflected by the deflecting device being directed to the light emerging surface and emerging therethrough, as the scanning beam, toward the target.

Optionally, a central axis of the beam incident on the optical element may be substantially perpendicular to a normal to the target.

Further optionally, the optical system may further include an objective lens that converges the scanning beam on/inside the target.

In a particular case, the objective lens may include an lens element provided on a target side of the optical element.

Optionally, the lens element and the optical element are made of the same material.

In a particular case, the objective lens may include a diffraction lens structure profiled on the light emerging surface of the optical element.

Further optionally, the deflecting device is arranged at a light incident surface side focal point of the objective lens.

Still optionally, an end surface of the optical fiber and a target side focal point of the objective lens may have a conjugate relationship.

In some embodiments, the deflecting device is a two-axis type deflector that deflects the light beam such that the scanning beam scans within a two-dimensional area of the target.

In a particular case, the optical element may have a second surface, the light beam passed through the light incident surface being incident on one of the first surface and the second surface, then directed to the other of the first surface and the second surface, and then directed to the light emerging surface.

Alternatively, the confocal probe may have a second deflecting device. In this case, the optical element may have a second surface, on which the second deflecting device is mounted, and the light beam passed through the light incident surface may be incident on the deflecting device through the first surface, then directed to the second deflector through the second surface, and then directed to the light emerging surface.

Alternatively, the deflecting device and the second deflecting device are one-axis type deflector, deflecting directions of the deflecting device and the second deflecting device being perpendicular to each other.

In the above cases, the optical element may be a penta prism.

In another example, the confocal probe may include a polarization beam splitting surface arranged between the light incident surface and the deflecting device, and a λ/4 plate arranged between the beam splitting surface and the deflecting device. With this configuration, the light beam incident on the light incident surface may be linearly polarized such that the light beam passed through the light incident surface being reflected by the polarization beam splitting surface, the light beam reflected by the polarization beam splitting device entering the deflection device through the λ/4 plate, the light beam deflected by the deflection device passing through the λ/4 plate passing through the polarization beam splitting surface and directed to the light emerging surface.

Optionally, the optical system may further include an objective lens that converges the scanning beam on/inside the target.

Alternatively, the objective lens may be a diffraction lens structure profiled on the light emerging surface of the optical element.

Optionally, the deflecting device may be arranged at a light incident surface side focal point of the objective lens.

Further optionally, an end surface of the optical fiber and a target side focal point of the objective lens may have a conjugate relationship.

Still optionally, the optical element may be a rectangular prism having two surfaces forming a right angle which serve as the light incident surface and the light emerging surface, respectively, and an oblique surface which serves as the first surface.

Further optionally, the optical element may have a second surface, the light beam passed through the light incident surface being incident on the second surface, directed to the first surface, and then directed to the light emerging surface, and the optical element may be a rectangular prism having two surfaces forming a right angle and an oblique surface. In this case, the oblique surface serves as the second surface. One of the two surfaces forming the right angle serves as the light incident surface and the other serves as the first surface, respectively. Further, the oblique surface serves also as the light emerging surface.

According to another aspect of the invention, there is provided a confocal probe to be inserted in a human cavity to observe in vivo tissues in the human cavity, the confocal probe introduces a light beam to a target at a location substantially perpendicular to an inserting direction of the confocal probe and receiving light from the target to obtain an image of the target. Such a confocal probe may include a penta prism arranged in an optical path of the light beam, the penta prism having a first surface and a second surface that bends the optical path substantially in a direction perpendicular to an direction in which the light beam incident on the penta prism, and a scanning device mounted on at least one of the first surface and the second surface, the scanning device scanning the light beam on the in vivo tissues in the human cavity.

According to a further aspect of the invention, there is provided a confocal probe to be inserted in a human cavity to observe in vivo tissues in the human cavity, the confocal probe introduces a light beam to a target at a location substantially perpendicular to an inserting direction of the confocal probe and receiving light from the target to obtain an image of the target. The confocal probe may be provided with a polarization beam splitter having a shape of a rectangular solid. Further, the polarization beam splitter may include (a) a light incident surface and light emerging surface, (b) a polarization beam splitting surface substantially arranged to form an angle of 45 degrees with respect to each of the light incident surface and the light emerging surface, and (c) a predetermined surface on which the light beam is incident via the polarization beam splitting surface, the polarization beam splitter being arranged such that the polarization beam splitting surface substantially inclines, with respect to the direction in which the light beam is incident on the polarization beam splitter, at an angle of 45 degrees. The confocal probe may further include a polarizing element mounted on the predetermined surface to change a polarized status of a beam incident thereon, and a scanning device mounted on the polarizing element, which deflects the light beam passed through the polarizing element to scan on the in vivo tissues. The light beam incident on the polarization beam splitter may be incident on the scanning device through the light incident surface, the polarized beam splitting surface and the polarizing element, the deflected light beam being emerged from the light emerging surface.

According to another aspect of the invention, there is provided a confocal probe to be inserted in a human cavity to observe in vivo tissues in the human cavity, the confocal probe introduces a light beam to a target at a location substantially perpendicular to an inserting direction of the confocal probe and receiving light from the target to obtain an image of the target. The confocal probe may include a rectangular prism arranged on an optical path of the light beam, the rectangular prism having a two surfaces perpendicular to each other and an oblique surface intersecting with the two surfaces perpendicular to each other, the light beam incident on the rectangular prism and the light beam emerges from the rectangular prism are substantially perpendicular to each other, and a scanning device mounted on one of the surfaces of the rectangular prism to deflect the light beam to scan on the in vivo tissues. The light beam may enter the rectangular prism through one of the two surfaces perpendicular to each other perpendicularly, the light beam entered the rectangular prism being deflected by the scanning device and emerged from the rectangular prism.

According to a further aspect of the invention, there is provided a confocal probe device. The confocal device may include a light source that emits a light beam for illuminating a target, a confocal probe which may be any one of the confocal probes described above, a light receiving element, and an image signal generating unit. The light beam converged on the target is reflected thereby, and the reflected light beam, which returns the same path as that of the illuminating beam and enters the optical fiber. The light beam returned from the target and passed through the optical fiber is received by the light receiving element. The image signal generator generates an image signal in accordance with an output of the light receiving element.

DETAILED DESCRIPTION OF THE EMBODIMENTS

Hereinafter, referring to the accompanying drawings, confocal probes according to embodiments of the invention will be described.

First Embodiment

Figure 1:
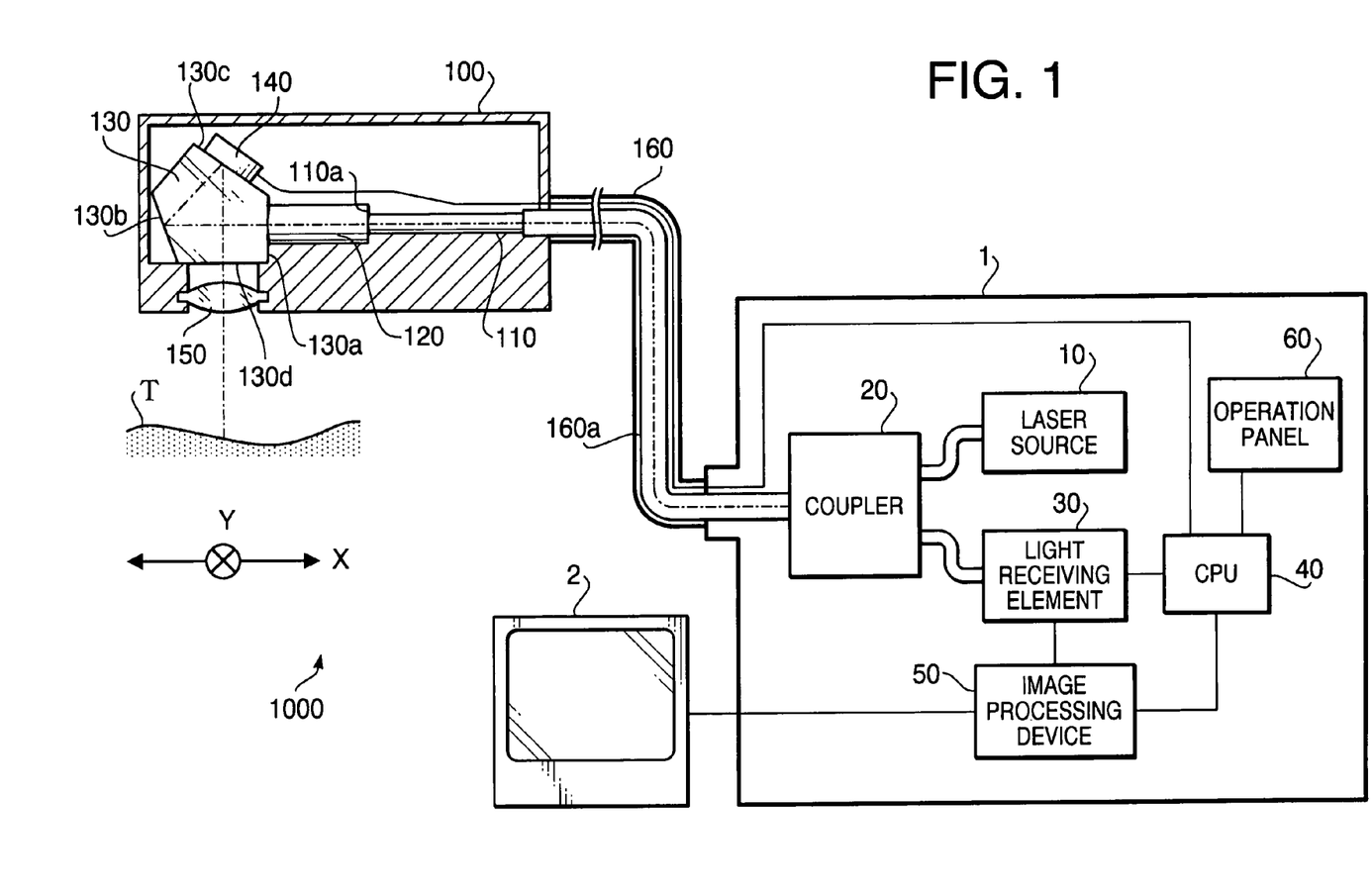
FIG. 1 shows a block diagram illustrating a configuration of a confocal probe device provided with a confocal probe according to a first embodiment of the invention.

FIG. 1 shows a structure of a confocal probe device 1000 employing a confocal probe 100 according a first embodiment of the invention.

The confocal probe device 1000 includes, as shown in FIG. 1, the confocal probe 100, a processor 1 and a monitor 2.

An operator of the confocal probe device 1000 inserts the confocal probe 100 through a forceps channel (not shown) of an endoscope. Through the confocal probe 100, the operator can obtain an image of an object (e.g., in vivo tissues in the human cavity). The image captured using the confocal probe 100 is processed by the processor 1, and displayed on the screen of the monitor 2.

The processor 1 includes a laser source 10, a coupler 20, a light receiving element 30, a CPU (Central Processing Unit) 40, an image processing device 50 and an operation panel 60.

The laser source 10 is configured to emit an He—Ne laser beam having a wavelength of 632 nm. It is known that the shorter the wavelength of the laser beam is, the higher the resolution of the confocal probe is. In this regard, the laser source 10 can be replaced with any other laser source capable of emitting a laser beam having a short wavelength. For example, the laser source may be one emitting an Ar$^+$ laser beam.

The laser beam emitted by the laser source 10 is directed to the confocal probe 100 through the coupler 20.

The confocal probe 100 includes an optical fiber 110, a GRIN lens (or a collimating lens) 120, a penta prism 130, a micromirror 140, an objective lens 150 and a cable 160. The optical fiber 110, the GRIN lens 120, the penta prism 130 and the objective lens 150 are fixedly mounted on the inner wall of the confocal probe 100 at predetermined positions. The wall on which the optical elements are mounted is formed such that the positional relationship therebetween are accurately adjusted only by securing them at the predetermined positions. With this structure, the assembling of the optical elements can be done easily. According to the first embodiment, the probe is of a side-view type which provides an image of a target (e.g., in vivo tissues) T facing a side surface of the confocal probe. That is, the optical axis of the objective lens 150 is substantially perpendicular to an axis of the cable 160 (i.e., the inserting direction of the confocal probe 100).

The confocal probe 100 is electrically and optically connected to the processor 1 with the cable 160. The optical fiber 110 is a single mode fiber, and is arranged to extend, through the cable 160, from an processor side end of the cable 160 to the confocal probe 100. The optical fiber 110 transmits the light output by the processor 1 toward the GRIN lens 120. It should be noted that a portion of the optical fiber 110 inside the cable 160 is coated with a jacket 160$a$.

The GRIN lens 120 is a lens whose refractive index gradually changes therein, and functions as a collimating lens in this embodiment. That is, the light beam emerged from the optical fiber 110 and entered the GRIN lens 120 emerges therefrom as parallel light, which is directed toward the penta prism 130.

The penta prism 130 is made of glass material such as BK7 or synthetic quartz. The penta prism 130 has a second surface 130$c$ and a first surface 130$b$ forming an angle of approximately 45°, with which the beam entering the penta prism 130 and the beam emerging from the penta prism 130 form a right angle.

The light beam emerges from the GRIN lens 120 enters the penta prism 130 through a surface 130$a$. In the following description, the surface 130$a$ will be referred to as an incident surface. On the first surface 130$b$, a reflection coating with a metal layer and/or multiple layers of dielectric material is applied so that the first surface 130$b$ serves as a high reflective surface. With this configuration, the light beam entered the penta prism 130 is reflected by the first surface 130$b$ and is incident on the micromirror 140 mounted on the second surface 130$c$.

The micromirror 140 includes a mirror unit and a supporting base (not shown) which rotatably supports the mirror unit. The supporting base of the micromirror 140 is secured on the second surface 130$c$ of the penta prism 130. The mirror unit of the micromirror 140 is of a so-called two-axis scanning type, which operates, under control of the CPU 40, such that the beam is dynamically deflected to scan in the X direction and in the Y direction, simultaneously. As shown in FIG. 1, the X direction and the Y direction are perpendicular to the optical axis of the objective lens 150. A plane defined by the X direction and the Y direction are substantially parallel with the surface of the target portion T to be observed.

The light beam deflected by the micromirror 140 is incident on the penta prism 130 again through the second surface 130$c$. The light beam entered the penta prism 130 emerges from a surface 130$d$ and is incident on the objective lens 150. In the following description, the surface 130$d$ will be referred to as a light emerging surface.

It should be noted that, if the confocal probe 100 is configured such that the optical elements therein are formed of different material, the coefficients of thermal expansion thereof may differ from each other. In such a case, thermal characteristics of the optical system may be deteriorated. If the thermal characteristics are deteriorated, positional relationship between the optical elements may be deteriorated, which causes unexpected displacement of the optical path. In such a case, a clear image of the target may not be obtained.

To cope with this problem, according to the first embodiment, the penta prism 130 and the objective lens 150 are formed with the same optical material. By forming the optical elements arranged in the confocal probe 100 with the same optical material, a bad effect, as described above, of the temperature change around the confocal probe 100 can be avoided. The light beam emerged from the light emerging surface 130$d$ is converged by the objective lens 150 on the surface or a position inside the target portion T.

According to the first embodiment, the micromirror 140 and the objective lens 150 are arranged such that a telecentric relationship is satisfied so that the light beam is incident on the target portion T substantially normally thereto. That is, the micromirror 140 is provided at a position which is a focal plane of the objective lens 150 if the parallel light is incident on the objective lens from the target side. With this configuration, an oblique incident of the light beam on the target portion T can be avoided, and a loss of light is suppressed.

The beam converged on the surface or the position inside target portion T is reflected thereat, and is incident on the objective lens 150. The light is then converted to the parallel light and incident on the GRIN lens 120. Alternatively, when the light is excitation light which causes the tissues to fluoresce, the fluorescent light is directed from the target portion T to the objective lens 150.

The optical fiber 110 is a single mode fiber as described above. Therefore, the diameter of the core is approximately within a range of 3 µm through 9 µm, depending on the wavelength of the beam passing therethrough. The end surface 110a of the optical fiber 110 is located at a position conjugate with the target side focal point of the objective lens 150. Thus, only the part of light, which is incident on the GRIN lens 120 and is converged on the target portion T, is converged on the end surface 110a. The light converged on the end surface 110a proceeds through the optical fiber 110 and the coupler 20, and is received by the light receiving element 30.

The light reflected by the surface of the position inside the target portion T, which is not located on the target side focal plane of the objective lens 150, is not converged on the end surface 110a, and thus does not enter the optical fiber 110. Therefore, such light will not be transmitted to the processor 1. That is, in the first embodiment, the end surface 110a of the optical fiber 110 serves as a pinhole which shields the light other than the light reflected at the target side focal plane of the objective lens 150, and functions to transmit the image obtained by the optical system of the confocal probe 100 to the processor 1.

The light receiving element 30 performs photo-electric conversion of the received light to generate an image signal, which is transmitted to the image processing device 50. The image processing device 50 applies image processing processes to generate various video signals including a composite video signal, RGB signal, S-video signal. When a video signal is transmitted to the monitor 2, the image of the target portion T on the focal plane of the objective lens 150, formed by the confocal probe 100, is displayed on the screen of the monitor 2.

The operator operates the operation panel 60 of the processor 1 to input settings related to the image, such as the scanning direction and angular range achieved by the micromirror 140. For example, by changing the scanning angle of the micromirror 140 (i.e., an area on the target portion T within which the laser beam scans), the field of view of the observed image can be changed. When the scanning angle is small, a small area of the target portion T is observed, and when the scanning angle is large, a large area of the target portion T is observed.

The information input through the operation panel 60 by the operator is transmitted to the CPU 40. The CPU 40 drives the micromirror 140 in accordance with the information as transmitted. When the micromirror 140 is driven, the laser beam scans in the X direction and the Y direction. Then, an image formed by the light reflected by the scanned portion is transmitted to the processor 1 as the observation image. With this configuration, the operator can select and observe a desired image captured by the confocal probe 100.

Second Embodiment

Figure 2:
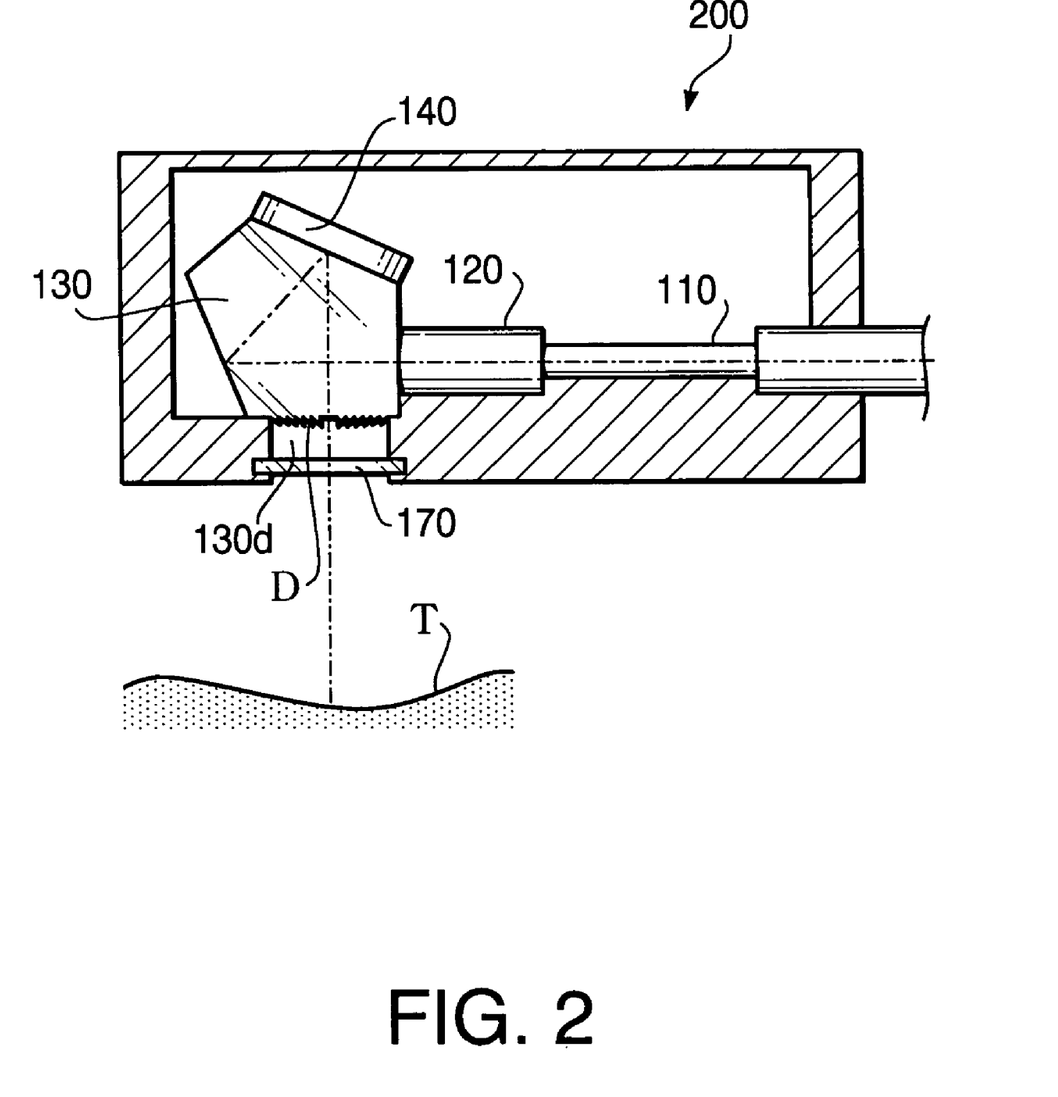
FIG. 2 shows a structure of a confocal probe according to a second embodiment of the invention.

FIG. 2 shows a confocal probe 200 according to a second embodiment of the invention. The confocal probe 200 is different from the confocal probe 100 in that a diffractive lens structure D is formed on the light emerging surface 130d, and the objective lens 150 of the first embodiment is omitted. Further to the above difference, the confocal probe 200 is provided with a transparent parallel plate 170, which is provided for protecting the penta prism 130, in particular, the light emerging surface 130d and the diffractive lens structure D formed thereon. According to the confocal probe 200 shown in FIG. 2, the size of the confocal probe in a direction perpendicular to the X and Y directions (i.e., the size in a direction along which the light beam incident on the target portion T) can be made smaller since the objective lens 150 is unnecessary.

Figure 8A:
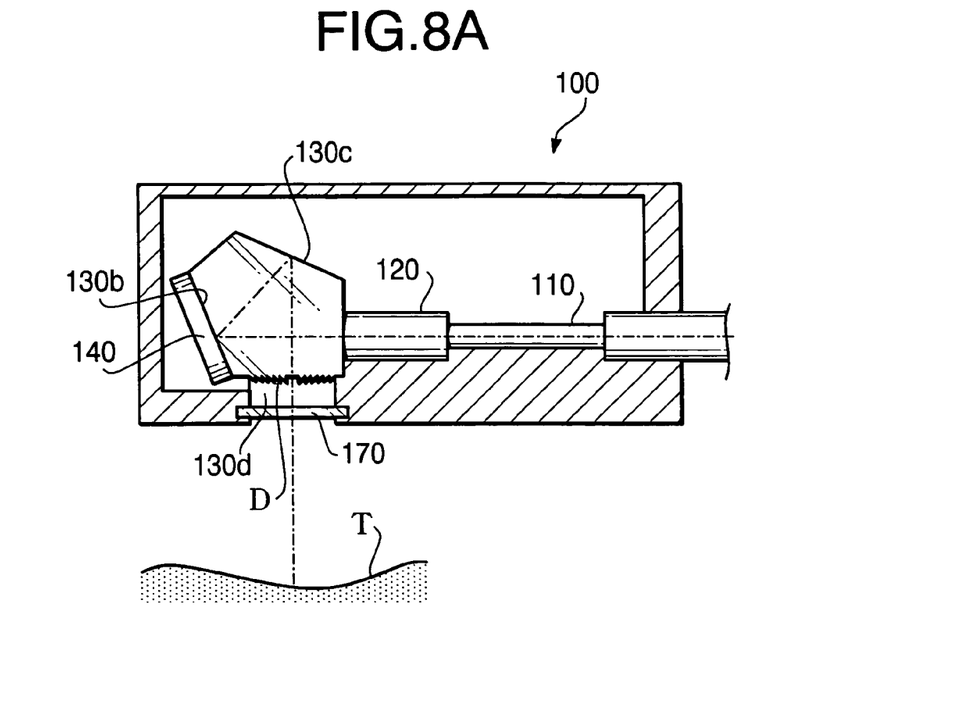
FIGS. 8A and 8B show modifications of the confocal probe according to the first embodiment.
Figure 8B:
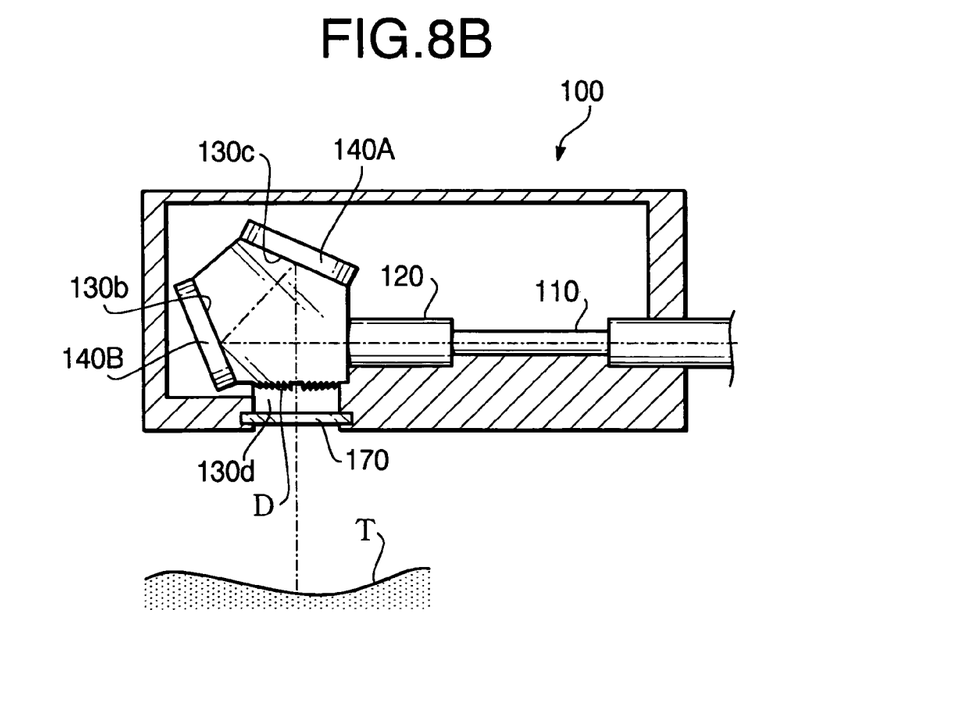

In the first and second embodiments, the micromirror 140 is mounted on the second surface 130c of the penta prism 130. However, the invention need not be limited to such a configuration, and the micromirror 140 may be mounted on the first surface 130b (see FIG. 8A). Further, in the above-described embodiments, the micromirror 140 is of a two-axis scanning type micromirror. Instead of this configuration, a one-axis scanning micromirror 140A which scans the beam in the X direction, and another one-axis scanning micromirror 140B which scans the beam in the Y direction may be used to obtain the similar effects. In such a case, the two micromirrors 140A and 140B may be mounted on the second surface 130c and the first surface 130b, respectively (see FIG. 8B). The one-axis scanning type micromirror generally requires a less space than the two-axis scanning type micromirror. Therefore, the structure employing two one-axis micromirrors can be made smaller than the structure employing the two-axis micromirror, although the number of the parts is greater.

Third Embodiment

Figure 3:
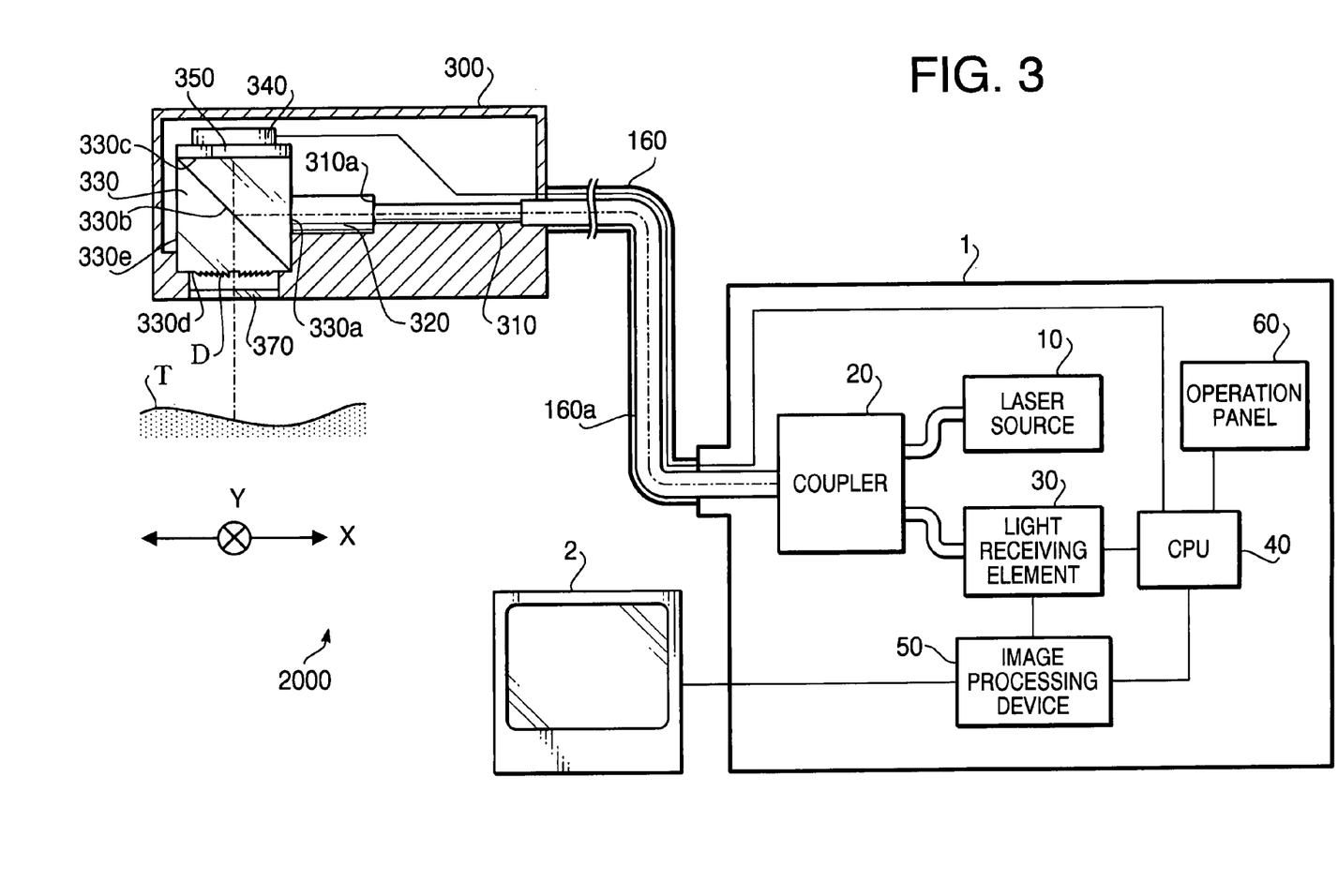
FIG. 3 shows a structure of a confocal probe according to a third embodiment of the invention.

FIG. 3 shows a block diagram of the confocal probe device 2000 according to a third embodiment of the invention. The confocal probe device 2000 has a similar configuration as the confocal probe device 1000 shown in FIG. 1 except that the confocal probe 100 is replaced with a confocal probe 300.

The confocal probe 300 includes, a polarization retaining optical fiber 310, a GRIN lens (or a collimating lens) 320, a polarization beam splitter 330, a micromirror 340, a λ/4 plate 350 and the cable 160. The polarization retaining optical fiber 310, the GRIN lens 320 and the polarization beam splitter 330 are fixedly secured on the inner wall of the confocal probe 300. The wall on which the optical elements are mounted is formed such that the positional relationship therebetween are accurately adjusted. Thus, the assembling of the optical elements can be done easily. Similar to the first embodiment, the confocal probe 300 is of a side-view type.

The confocal probe 300 is electrically and optically connected to the processor 1 with the cable 160. The polarization retaining optical fiber 310 is a single mode optical fiber, and arranged to extend, through the cable 160, from a processor side end of the cable 160 to the confocal probe 300. The polarization retaining optical fiber 310 transmits the light output by the processor 1 toward the GRIN lens 320 with retaining the polarization condition of the light. It should be noted that a portion of the optical fiber 310 inside the cable 160 is coated with a jacket 160a.

The GRIN lens 320 functions as a collimating lens as in the first embodiment. That is, the light beam emerged from the optical fiber 310 and entered the GRIN lens 320 emerges therefrom as parallel light and proceeds toward the polarization beam splitter 330. The parallel light emerged from the GRIN lens 320 is incident on a surface 330a at an incident angle of 0°. The beam thus enters the polarization beam splitter 330 through the surface 330a. Hereinafter, the surface 330a on which the beam from the light source 10 is incident will be referred to as an incident surface 330a.

The polarization beam splitter 330 functions to statically bend the optical path of the light beam incident thereon at a right angle. Specifically, the polarization beam splitter has a substantially cubical shape formed by cementing two rectangular prisms each having an isosceles triangular bottom surface as its oblique surface (which will be referred to as a cemented surface 330b). The cemented surface 330b is provided with a polarization layer, and functions as a polarization beam splitting surface. According to the third embodiment, the polarization beam splitting surface 330b forms an angle of 45° with respect to an optical path of the beam incident thereon through the incident surface 330a. Typically, the beam splitter 330 is formed of glass material such as BK7 or synthetic quartz.

The polarization beam splitting surface 330b is configured to reflect an s-polarized beam and transmits a p-polarized beam. Therefore, the light beam incident on the polarization beam splitting surface 330b through the incident surface 330a (which is an s-polarized beam) is reflected thereby and directed to a surface 330c. The reflection angle of the beam is 45°.

The surface 330c is perpendicular to the incident surface 330a, and forms an angle of 45° with respect to the polarization beam splitting surface 330b. On the surface 330c, the λ/4 plate 350 is mounted, which converts the beam passed therethrough from linearly polarized light to circularly polarized light, vice versa.

On the λ/4 plate 350, the micromirror 340 is mounted. Since the structure of the micromirror 340 is similar to the micromirror 140, description thereof is omitted.

As described above, the beam splitter 330 functions not only as an element that bends the optical path of the incident beam, but also as a body mounting the λ/4 plate 350 and the micromirror 340. As described above, the polarization beam splitter 330 is fixedly arranged on the inner wall of the confocal probe 300, thereby the alignment of the polarization with respect to the other optical elements can be done at relatively high accuracy. That is, only by mounting the λ/4 plate 350 and the micromirror 340 on the surface 330c of the polarization beam splitter 330, alignment of the λ/4 plate 350 and the micromirror 340 is completed. Therefore, the load for manufacturing the confocal probe 300 can be suppressed.

The s-polarized beam incident on the surface 330c is converted into the circular polarized beam by the λ/4 plate 350 and is directed to the micromirror 340. The circular polarized light beam, which is parallel light, is deflected by the micromirror 340, and passes through the λ/4 plate 350, thereby converted to a p-polarized beam with respect to the polarization beam splitting surface 330b. The polarization beam splitting surface 330b transmits the p-polarized beam, as described above. Thus, the p-polarized light beam (parallel light) passed through the λ/4 plate 350 further passes through the polarization beam splitting surface 330b and is directed to a surface 330d. In this embodiment, the surface 330d, on which the parallel light emerged from the micromirror 340 is incident will be referred to as a light emerging surface.

On the light emerging surface 330d, a diffraction lens D is formed. The parallel light incident on the surface 330d is converged by the diffraction lens D on the surface of the target portion T or on a plane inside the target portion T. It should be noted that a transparent parallel plate 370 is provided at the tip end of the confocal probe 300 in order to protect the light emerging surface 330d and the diffraction lens surface D provided thereon.

According to the third embodiment, the micromirror 340 and the diffraction lens surface D are arranged to have a telecentric relationship so that the light beam is incident on the target portion T substantially normally. With this configuration, an oblique incident of the light beam on the target portion T can be avoided, and a loss of light is suppressed.

The beam converged on the surface of the target portion T or on a plane inside the target portion T is reflected thereat, and is incident on the beam splitter 330 through the λ/4 plate 350. The light is then converted to the parallel light and incident on the GRIN lens 320.

The optical fiber 310 is a single mode fiber as described above. Therefore, the diameter of the core is approximately within a range of 3 μm through 9 μm, which depends on the wavelength of the beam passing therethrough. The end surface 310a of the optical fiber 310 is located at a position conjugate with the target side focal point of the diffraction lens surface D. Thus, only the part of light incident on the GRIN lens 320 and converged on the target portion T is converged on the end surface 310a of the optical fiber 310. The light converged on the end surface 310a is incident on the optical fiber 310, and transmitted, through the coupler 20, to the light receiving element 30.

The light reflected by the target portion T but not from the target side focal plane of the diffraction lens D is not converged on the end surface 310a, and thus does not enter the optical fiber 310. Therefore, such light will not be transmitted to the processor 1. That is, in the third embodiment, the end surface 310a of the optical fiber 310 functions a pinhole which shields the light other than the light reflected at the target side focal plane of the diffraction lens D, and to transmit the image obtained by the optical system of the confocal probe 300 to the processor 1.

The light receiving element 30 performs the photo-electric conversion with respect to the received light to generate an image signal, which is transmitted to the image processing device 50. The image processing device 50 applies image processing procedures to generate various video signals including a composite video signal, RGB signal, S-video signal. When such a signal is transmitted to the monitor 2, the image of the target portion T on the focal plane of the diffraction lens D is displayed on the screen of the monitor 2.

The operator operates the operation panel 60 of the processor 1 to input settings related to the image, such as the scanning direction and angular range achieved by the micromirror 340. For example, by changing the scanning angle of the micromirror 340 (i.e., an area on the target portion T within which the laser beam scans), the field of view of the observed image can be changed easily. When the scanning angle is small, a small area of the target portion T is observed, and when the scanning angle is large, a large area of the target portion T is observed.

The information input through the operation panel 60 by the operator is transmitted to the CPU 40. The CPU 40 drives the micromirror 340 in accordance with the information as transmitted. When the micromirror 340 is driven, the laser beam scans in the X direction and the Y direction. Then, an image formed by the light reflected by the scanned portion is transmitted to the processor 1 as the observation image. With this configuration, the operator can select and observe the image captured by the confocal probe device 2000.

According to the third embodiment, even if the polarization beam splitter 330 is displaced, the optical axes of the GRIN lens 320 and the diffraction lens surface D do not shift with respect to each other. Thus, the positional reliability of the confocal probe device 2000 is improved.

The above described configuration of the third embodiment can be modified in various way without departing from the scope of the invention.

Figure 9A:
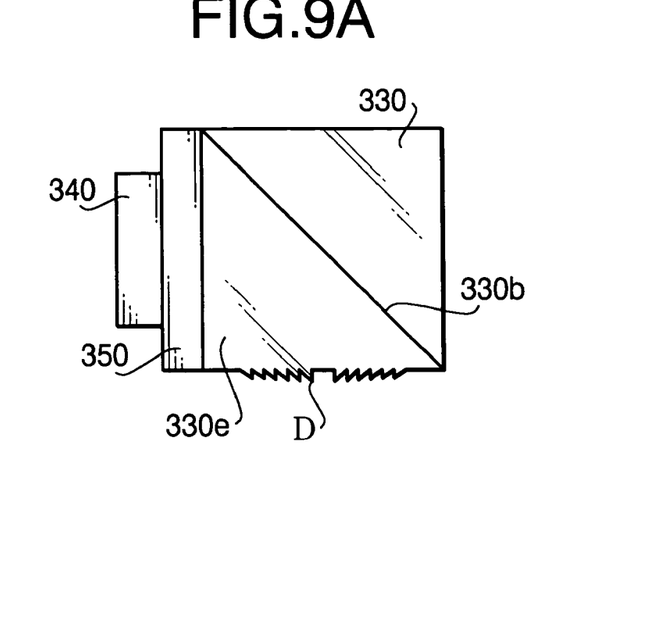
FIGS. 9A and 9B show modifications of the confocal probe according to the third embodiment.

For example, in the third embodiment, the light beam from the light source 10 is incident on the polarization beam splitting surface 330b as the s-polarized beam. However, the configuration need not be limited to one as described, and p-polarized beam can be used. In such a case, the λ/4 plate 350 and the micromirror 340 are to be provided on a surface 330e confronting the incident surface 330a instead of the surface 330c (see FIG. 9A).

The structure of the polarization beam splitter 330 need not be limited to one as described above. The beam splitter may be replaced with one which has a shape of a rectangular solid, and is configured such that the light incident surface and the light emerging surface being perpendicular to each other, the beam splitting surface and the beam incident surface or the beam emerging surface form 45°.

Figure 9B:
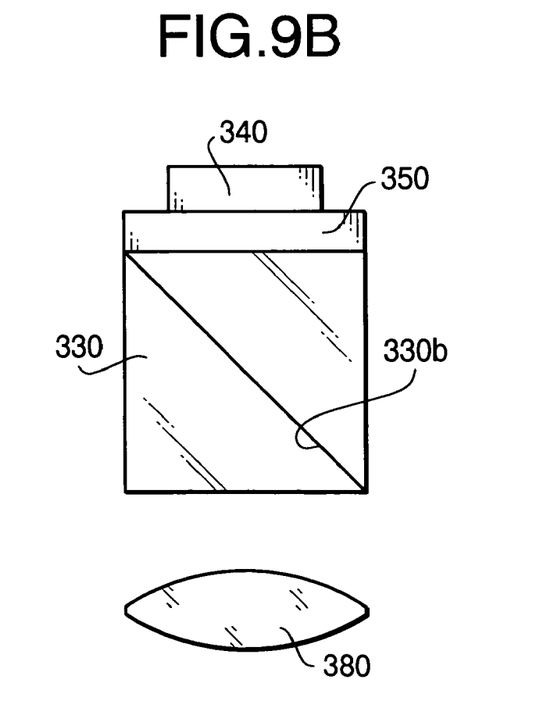

Further, in the third embodiment, the diffraction lens D, which functions as a converging lens, is integrally formed on the surface 330d of the polarization beam splitter 330. Another optical element may be used instead of the diffraction lens D. For example, an objective lens 380 may be provided on an optical path of the beam emerging from the light emerging surface of the polarization beam splitter 330 (see FIG. 9B). In this case, the objective lens 380 may preferably be made of the same material for the polarization beam splitter 330. Using the objective lens and the polarization beam splitter 330 formed of the same material, difference of the expansion rates among respective elements can be reduced. As a result, even in case where a relatively large temperature change is applied to the confocal probe 300, relative displacement of the optical elements due to the differences of the expansion rates can be suppressed, and the temperature characteristics of the confocal probe 300 is improved.

Fourth Embodiment

Figure 4:
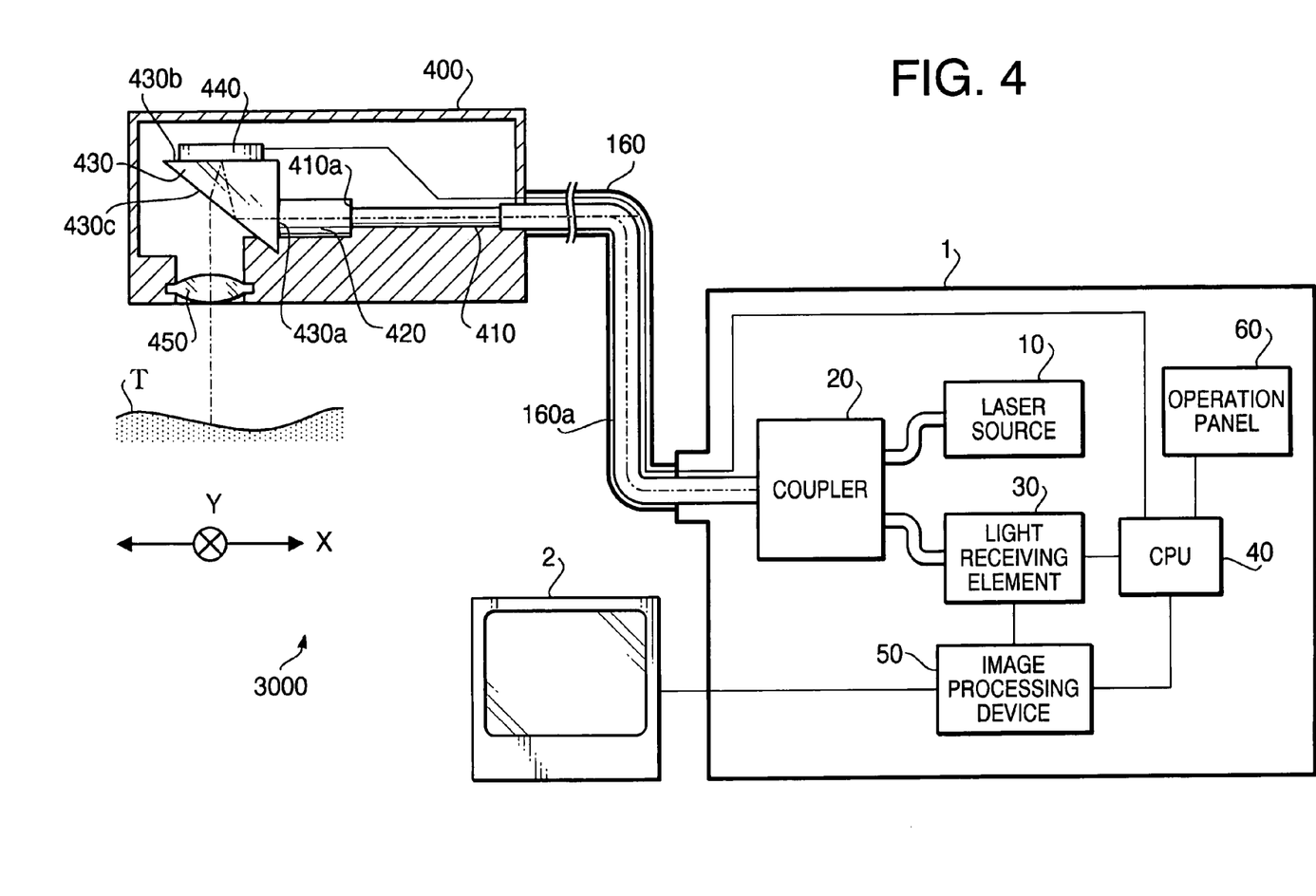
FIG. 4 shows a structure of a confocal probe according to a fourth embodiment of the invention.

FIG. 4 shows a block diagram of a confocal probe device 3000 according to a fourth embodiment of the invention. The confocal probe device 3000 has a similar configuration as the confocal probe device 1000 shown in FIG. 1 except that the confocal probe 100 is replaced with a confocal probe 400.

The confocal probe 400 includes an optical fiber 410, a GRIN lens (or a collimating lens) 420, a rectangular prism 430, a micromirror 440, an objective lens 450 and the cable 160. The optical fiber 410, the GRIN lens 420, the rectangular prism 430 and the objective lens 450 are fixedly mounted on the inner wall of the confocal probe 400. The wall on which the optical elements are mounted is formed such that the positional relationship therebetween are accurately adjusted. With this structure, the assembling of the optical elements can be done easily. Similar to the first through third embodiments, the probe is of a side-view type, and the optical axis of the objective lens 450 is substantially perpendicular to the axis of the cable 160.

The confocal probe 400 is connected to the processor 1 with the cable 160 electrically and optically. The optical fiber 410 is a single mode fiber, and arranged to extend, through the cable 160, from an processor side end of the cable 160 to the confocal probe 400. The optical fiber 410 transmits the light output by the processor 1 toward the GRIN lens 420. It should be noted that a portion of the optical fiber 410 inside the cable 160 is coated with a jacket 160a.

The GRIN lens 420 is similar to the GRIN lens 120 employed in the first embodiment. The light beam emerged from the optical fiber 410 and entered the GRIN lens 420 emerges therefrom as parallel light toward the rectangular prism 430.

The rectangular prism 430 is made of glass material such as BK7 or synthetic quartz. The rectangular prism 430 has a light incident surface 430a, a first surface 430b and an oblique surface 430c which forms an angle of 45° with respect to each of the surfaces 430a and 430b. The light incident surface 430a and the first surface 430b form a right angle. The light beam incident on the oblique surface 430c is reflected inside the rectangular prism 430 such that the optical axis is bent by the rectangular prism 430 by 90° as shown in FIG. 4.

The light beam emerges from the GRIN lens 420 enters the rectangular prism 430 through the light incident surface 430a. The light beam entered the rectangular prism 430 is reflected by the oblique surface 430c, and incident on the micromirror 440 that is mounted on the first surface 430b.

The micromirror 440 is similar to the micromirror 140 employed in the first embodiment.

The light beam deflected by the micromirror 440 is incident on the rectangular prism 430 again through the first surface 430b. The light beam entered the rectangular prism 430 emerges from the oblique surface 430c and is directed to the objective lens 450. In the following description, the surface 430c will occasionally be referred to as a light emerging surface.

Similarly to the first embodiment, according to the fourth embodiment, the rectangular prism 430 and the objective lens 450 are formed with the same optical material so that the effect of the temperature change around the confocal probe 400 can be avoided.

The light beam emerged from the light emerging surface 430c is converged by the objective lens 450 on the surface or a position at a predetermined depth of the target portion T.

According to the fourth embodiment, the micromirror 440 and the objective lens 450 are arranged such that a telecentric relationship is satisfied so that the light beam is incident on the target portion T substantially normally. Accordingly, an oblique incident of the light beam on the target portion T can be avoided, and a loss of light is suppressed.

Figure 5:
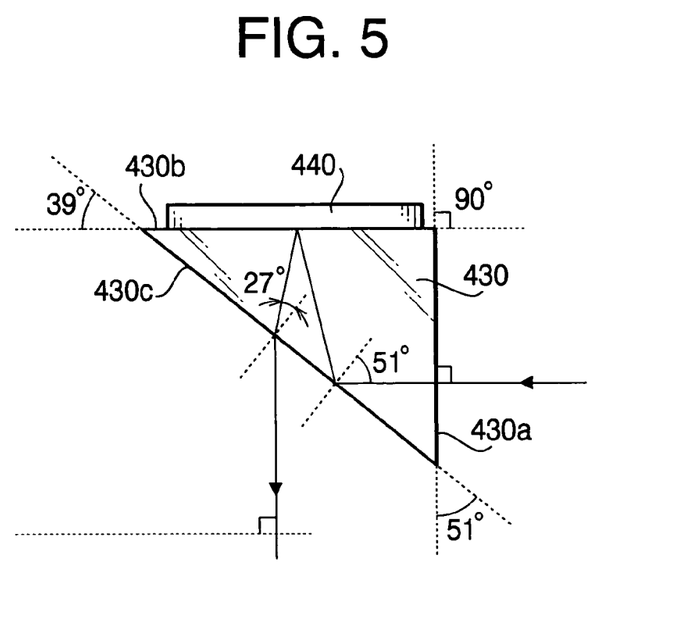
FIG. 5 shows a structure of a confocal probe according to a fourth embodiment of the invention.

FIG. 5 shows an enlarged view of the rectangular prism 430 and the micromirror 440 mounted thereon. The rectangular prism 430 shown in FIG. 5 is made of synthetic quartz having a refractive index of 1.463. In this example, the incident surface 430a and the emerging surface 430c form an angle of 51°, and a wavelength of the light beam transmitted therein is 488 nm.

A light beam incident on the incident surface 430a at an incident angle of zero degree is incident on the oblique surface 430c (the emerging surface 430c) at an incident angle of 51 degrees. A critical angle for the material of the rectangular prism 430 is 43.1°. Therefore, the light beam incident on the oblique surface 430c is totally reflected and incident on the first surface 430b (i.e., the micromirror 440). The beam deflected by the micromirror 440 is incident on the emerging surface 430c again. When the beam is incident on the emerging surface 430c second time, the incident angle is smaller than the critical angle. For example, when the micromirror 440 functions as a mirror surface parallel with the second surface 440c, the incident angle of the beam reflected by the micromirror 440 and incident on the emerging surface 430c is 27°.

The beam converged on the surface of or on a point inside the target portion T is reflected thereat, and is incident on the objective lens 450. The light is then converted to the parallel light and incident on the GRIN lens 420.

The optical fiber 410 is a single mode fiber as described above. Therefore, the diameter of the core is approximately within a range of 3 μm through 9 μm, depending on the wavelength of the beam passing therethrough. An end surface 410a of the optical fiber 410 is located at a position conjugate with the target side focal point of the objective lens 450. Thus, only the part of light incident on the GRIN lens 420 and converged on the target portion T is converged on the end surface 410a of the optical fiber 410. The light converged on the end surface 410a is incident on the optical fiber 410, and transmitted, through the coupler 20, to the light receiving element 30.

The light reflected by the target portion T but not from the target side focal plane of the objective lens 450 is not converged on the end surface 410a, and thus does not enter the optical fiber 410. Therefore, such light will not be transmitted to the processor 1. That is, in the fourth embodiment, the end surface 410a of the optical fiber 410 functions a pinhole which shields the light other than the light reflected at the target side focal plane of the objective lens 450, and to transmit the image obtained by the optical system of the confocal probe 400 to the processor 1.

The light receiving element 30 performs the photo-electric conversion with respect to the received light to generate an image signal, which is transmitted to the image processing device 50. The image processing device 50 applies image processing processes to generate various video signals including a composite video signal, RGB signal, S-video signal. When such a signal is transmitted to the monitor 2, the image of the target portion T on the focal plane of the objective lens 450 is displayed on the screen of the monitor 2.

The operator operates the operation panel 60 of the processor 1 to input settings related to the image, such as the scanning direction and angular range achieved by the micromirror 440. For example, by changing the scanning angle of the micromirror 440 (i.e., an area on the target portion T within which the laser beam scans), the field of view of the observed image can be changed.

The information input through the operation panel by the operator is transmitted to the CPU 40. The CPU 40 drives the micromirror 440 in accordance with the information as transmitted. When the micromirror 440 is driven, the laser beam scans in the X direction and the Y direction. Then, an image formed by the light reflected by the scanned portion is transmitted to the processor 1 as the observation image. With this configuration, the operator can select and observe the image captured by the confocal probe 400.

Fifth Embodiment

Figure 6:
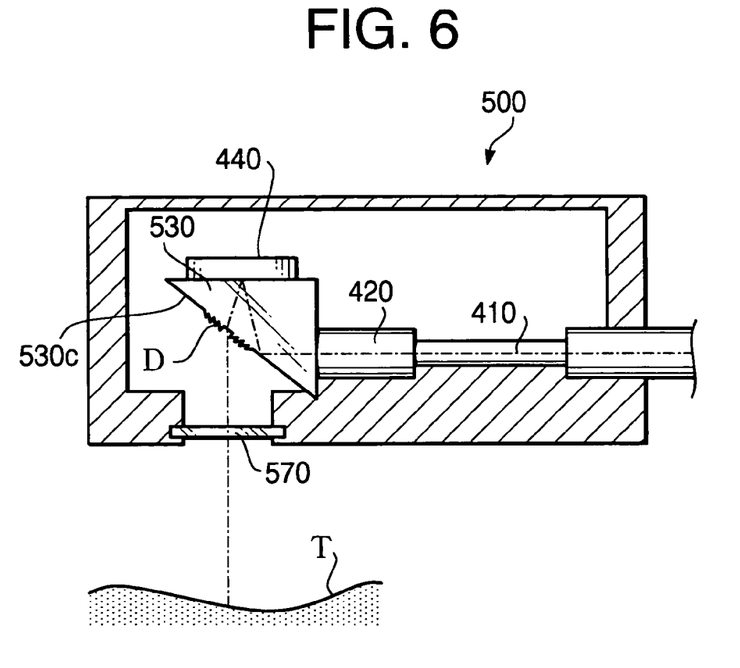
FIG. 6 is an enlarged view showing a structure of a part of a confocal probe according to a fifth embodiment of the invention.

FIG. 6 shows a confocal probe 500 according to a fifth embodiment. The confocal probe 500 is similar to the confocal probe 400 except that the objective lens 450 of the confocal probe 400 is omitted and a diffraction lens D and a transparent parallel plate 570 are provided. The diffraction lens D has a function similar to the objective lens 450. The parallel plate 570 is provided for protecting the emerging surface 530c and the diffraction lens D formed thereon.

According to the fifth embodiment, a thickness of the confocal probe 500 (i.e., a length of the confocal probe 500 in a direction perpendicular to X and Y directions in FIG. 6) can be made relatively small. The micromirror 440 is arranged at a point which is a focal plane of the diffraction lens D if the parallel light is incident on the diffraction lens D from the target portion T. With this configuration, an oblique incident of the light beam on the target portion T can be avoided, and a loss of light is suppressed.

Sixth Embodiment

Figure 7:
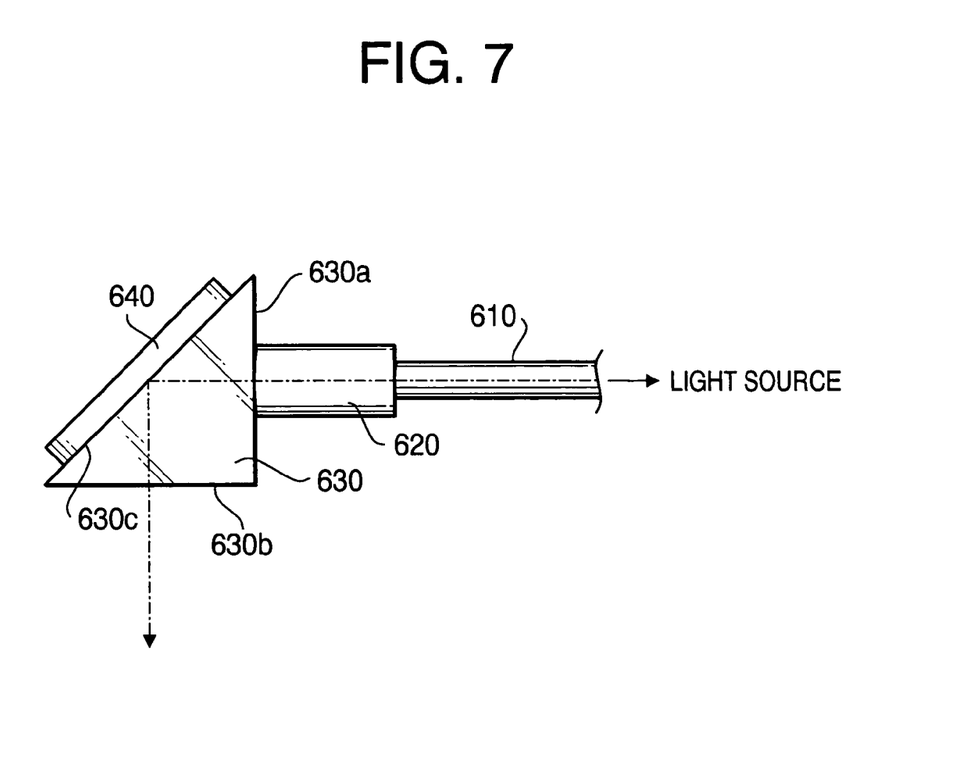
FIG. 7 is an enlarged view showing an arrangement of a prism and a micromirror according to a sixth embodiment of the invention.

FIG. 7 shows an enlarged view of a rectangular prism 630, a micromirror 640 mounted thereon, a GRIN lens 620 and a fiber 610 according to a sixth embodiment. The rectangular prism 630, the micromirror 640 can replace the rectangular prism 430 and the micromirror 440 of the fourth embodiment shown in FIG. 4. As shown in FIG. 7, according to the sixth embodiment, two surfaces 630a and 630b are perpendicular to each other, and a surface 630c is inclined with respect to the surfaces 630a and 630b. The light beam enters the rectangular prism 630 through a light incident surface 630a, is reflected by an oblique surface 630c downward in the drawing, and emerges from a light emerging surface 630b. In this case, as shown in FIG. 7, the micromirror 640 is mounted on the oblique surface 630c.

In each of the above-described embodiments, the laser source emits the He-Ne laser. It should be noted that a light source emitting a beam having a short wavelength including a near-ultraviolet light (i.e., a high-pressure mercury lamp) may be employed as the light source. In such a case, fluorescent light emitted by the target portion T can be observed.

The present disclosure relates to the subject matters contained in Japanese Patent Applications No. 2003-046625, No. 2003-046626 and No. 2003-046627, all filed on Feb. 24, 2003, which are expressly incorporated herein by reference in their entireties.

What is claimed is:

1. A confocal probe that emits a scanning beam to a target and receives light returned from the target to obtain an image of the target, the confocal probe having a body accommodating an optical system,
the optical system comprising:
an optical fiber through which a light beam is introduced to the optical system;
a converging lens that converges the light beam introduced by the optical fiber;
an optical element having a light incident surface, a first surface and a light emerging surface which statically define an optical path of the light beam; and
a deflecting device mounted on the first surface of the optical element,
wherein the optical fiber, the converging lens and the optical element are secured on an inner wall of the body at predetermined positions, and
wherein the light beam emerged from the converging lens enters the optical element through the light incident surface, the light beam passed through the light incident surface entering the deflecting device through the first surface, the deflecting device dynamically deflecting the light beam incident thereon, the light beam deflected by the deflecting device being directed to the light emerging surface and emerging therethrough, as the scanning beam, toward the target.

2. The confocal probe according to claim 1, wherein a central axis of the beam incident on the optical element is substantially perpendicular to a normal to the target.

3. The confocal probe according to claim 1, where the optical system further comprises an objective lens that converges the scanning beam on/inside the target.

4. The confocal probe according to claim 3, wherein the objective lens includes an lens element provided on a target side of the optical element.

5. The confocal probe according to claim 4, wherein the lens element and the optical element are made of the same material.

6. The confocal probe according to claim 3, wherein the objective lens includes a diffraction lens structure profiled on the light emerging surface of the optical element.

7. The confocal probe according to claim 3, wherein the deflecting device is arranged at a light incident surface side focal point of the objective lens.

8. The confocal probe according to claim 3, wherein an end surface of the optical fiber and a target side focal point of the objective lens have a conjugate relationship.

9. The confocal probe according to claim 1, wherein the deflecting device is a two-axis type deflector that deflects the light beam such that the scanning beam scans within a two-dimensional area of the target.

10. The confocal probe according to claim 1, wherein the optical element has a second surface, the light beam passed through the light incident surface being incident on one of the first surface and the second surface, then directed to the other of the first surface and the second surface, and then directed to the light emerging surface.

11. The confocal probe according to claim 10, wherein the optical element is a penta prism.

12. The confocal probe according to claim 1, further comprising a second deflecting device,
wherein the optical element has a second surface, on which the second deflecting device is mounted, and
wherein the light beam passed through the light incident surface is incident on the deflecting device through the first surface, then directed to the second deflector through the second surface, and then directed to the light emerging surface.

13. The confocal probe according to claim 12, wherein the optical element is a penta prism.

14. The confocal probe according to claim 12, wherein the deflecting device and the second deflecting device are one-axis type deflector, deflecting directions of the deflecting device and the second deflecting device being perpendicular to each other.

15. The confocal probe according to claim 14, wherein the optical element is a penta prism.

16. The confocal probe according to claim 1, wherein the optical element includes:
a polarization beam splitting surface arranged between the light incident surface and the deflecting device; and
a λ/4 plate arranged between the beam splitting surface and the deflecting device,
the light beam incident on the light incident surface being linearly polarized such that the light beam passed through the light incident surface being reflected by the polarization beam splitting surface, the light beam reflected by the polarization beam splitting surface entering the deflection device through the λ/4 plate, the light beam deflected by the deflection device passing through the λ/4 plate passing through the polarization beam splitting surface and directed to the light emerging surface.

17. The confocal probe according to claim 16, where the optical system further comprises an objective lens that converges the scanning beam on/inside the target.

18. The confocal probe according to claim 17, wherein the objective lens includes a diffraction lens structure profiled on the light emerging surface of the optical element.

19. The confocal probe according to claim 17, wherein the deflecting device is arranged at a light incident surface side focal point of the objective lens.

20. The confocal probe according to claim 17, wherein an end surface of the optical fiber and a target side focal point of the objective lens have a conjugate relationship.

21. The confocal probe according to claim 1, wherein the optical element is a rectangular prism having two surfaces forming a right angle which serve as the light incident surface and the light emerging surface, respectively, and an oblique surface which serves as the first surface.

22. The confocal probe according to claim 1,
wherein the optical element has a second surface, the light beam passed through the light incident surface being incident on the second surface, directed to the first surface, and then directed to the light emerging surface, and
wherein the optical element is a rectangular prism having two surfaces forming a right angle and an oblique surface, the oblique surface serving as the second surface, one of the two surfaces forming the right angle serving as the light incident surface and the other serving as the first surface, respectively, the oblique surface also serving as the light emerging surface.

23. A confocal probe device, comprising:
a light source that emits a light beam for illuminating a target;
a confocal probe having a body accommodating an optical system,
the optical system comprising:
an optical fiber, the light beam emitted by the light source being introduced to the optical system through the optical fiber;
a converging lens that converges the light beam emitted by the light source and introduced by the optical fiber;
an optical element having a light incident surface, a first surface and a light emerging surface which statically define an optical path of the light beam;
a deflecting device mounted on the first surface of the optical element;
a light receiving element; and
an image signal generating unit,
wherein the optical fiber, the converging lens and the optical element are secured on an inner wall of the body at predetermined positions,
wherein the light beam emerged from the converging lens enters the optical element through the light incident surface, the light beam passed through the light incident surface entering the deflecting device through the first surface, the deflecting device dynamically deflecting the light beam incident thereon, the light beam deflected by the deflecting device being directed to the light emerging surface and emerging therethrough, as the scanning beam, toward the target, and
wherein the light beam converged on the target is reflected thereby, the reflected light beam returning the path of the light beam for illuminating the target and entering the optical fiber, the light beam returned from the target and passed through the optical fiber being received the light receiving element, the image signal generator generating an image signal in accordance with an output of the light receiving element.

* * * * *